(12) United States Patent
Gu et al.

(10) Patent No.: US 10,097,821 B2
(45) Date of Patent: Oct. 9, 2018

(54) HYBRID-RESOLUTION ENCODING AND DECODING METHOD AND A VIDEO APPARATUS USING THE SAME

(71) Applicant: Tencent Technology (Shenzhen) Company Limited, Shenzhen (CN)

(72) Inventors: Chenchen Gu, Shenzhen (CN); Xunan Mao, Shenzhen (CN); Jingchang Chen, Shenzhen (CN); Jing Lv, Shenzhen (CN); Ronggang Wang, Shenzhen (CN); Bocheng Xin, Shenzhen (CN); Wen Gao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 705 days.

(21) Appl. No.: 14/091,305

(22) Filed: Nov. 26, 2013

(65) Prior Publication Data

US 2014/0140407 A1    May 22, 2014

Related U.S. Application Data

(63) Continuation of application No. PCT/CN2013/075965, filed on May 21, 2013.

(30) Foreign Application Priority Data

Nov. 12, 2012    (CN) .......................... 2012 1 0450379

(51) Int. Cl.
H04N 19/139    (2014.01)
H04N 19/59    (2014.01)
(Continued)

(52) U.S. Cl.
CPC ..... *H04N 19/00757* (2013.01); *H04N 19/117* (2014.11); *H04N 19/132* (2014.11);
(Continued)

(58) Field of Classification Search
CPC .... H04N 19/176; H04N 19/61; H04N 19/593; G06T 9/004
See application file for complete search history.

(56) References Cited

U.S. PATENT DOCUMENTS

| 6,834,155 | B1 * | 12/2004 | Taniguchi | .............. | H04N 5/783 |
| | | | | | 386/349 |
| 2001/0031003 | A1 * | 10/2001 | Sawhney | ............... | H04N 19/63 |
| | | | | | 375/240.14 |

(Continued)

FOREIGN PATENT DOCUMENTS

| CN | 101375605 A | | 2/2009 |
| CN | 101938656 A | * | 1/2011 |

(Continued)

OTHER PUBLICATIONS

Tencent Technology, ISRWO, PCT/CN2013/075965, Aug. 1, 2013, 7 pgs.

(Continued)

*Primary Examiner* — Anner N Holder
*Assistant Examiner* — Hesham Abouzahra
(74) *Attorney, Agent, or Firm* — Morgan, Lewis & Bockius LLP

(57) ABSTRACT

The present invention provides a hybrid-resolution encoding and decoding method. The method includes performing full-resolution standard coding on an I frame that adopts only intra-frame coding in a video frame sequence, and performing frame reconstruction to obtain a reconstructed frame of the I frame; performing down-sampling on the reconstructed frame of the I frame to obtain a first sampling (Continued)

image of the reconstructed frame of the I frame; performing down-sampling on a non-I frame in the video frame sequence to obtain a second sampling image of the non-I frame; performing standard coding on the second sampling image of the non-I frame by using the first sampling image of the reconstructed frame of the I frame that corresponds to the non-I frame as a reference frame; and sending a video code stream that includes the full-resolution standard coded I frame and the standard coded non-I frame.

10 Claims, 10 Drawing Sheets

(51) Int. Cl.
*H04N 19/159* (2014.01)
*H04N 19/176* (2014.01)
*H04N 19/172* (2014.01)
*H04N 19/117* (2014.01)
*H04N 19/132* (2014.01)
*H04N 19/137* (2014.01)
*H04N 19/182* (2014.01)

(52) U.S. Cl.
CPC ......... *H04N 19/137* (2014.11); *H04N 19/139* (2014.11); *H04N 19/159* (2014.11); *H04N 19/172* (2014.11); *H04N 19/176* (2014.11); *H04N 19/182* (2014.11); *H04N 19/59* (2014.11)

(56) References Cited

U.S. PATENT DOCUMENTS

| | | | | |
|---|---|---|---|---|
| 2004/0213345 | A1* | 10/2004 | Holcomb | H04N 19/527 375/240.03 |
| 2005/0281334 | A1* | 12/2005 | Walker | H04N 19/105 375/240.16 |
| 2012/0328200 | A1* | 12/2012 | Liu | G06T 5/004 382/199 |
| 2013/0028327 | A1* | 1/2013 | Narroschke | H04N 19/147 375/240.16 |

FOREIGN PATENT DOCUMENTS

| | | |
|---|---|---|
| CN | 102006483 A | 4/2011 |
| CN | 102196256 A | 9/2011 |
| CN | 102196258 A | 9/2011 |
| WO | WO 2006078109 A1 | 7/2006 |
| WO | WO 2011/087963 A1 | 7/2011 |

OTHER PUBLICATIONS

Tencent Technology, IPRP, PCT/CN2013/075965, dated May 12, 2015, 5 pgs.

* cited by examiner

FIG. 6

HYBRID-RESOLUTION ENCODING AND DECODING METHOD AND A VIDEO APPARATUS USING THE SAME

RELATED APPLICATIONS

This application is a continuation application of PCT Patent Application No. PCT/CN2013/075965, entitled "A HYBRID-RESOLUTION ENCODING AND DECODING METHOD AND A VIDEO APPARATUS USING THE SAME" filed on May 21, 2013, which claims priority to Chinese Patent Application No. 201210450379.7, entitled "A HYBRID-RESOLUTION ENCODING AND DECODING METHOD AND A VIDEO APPARATUS USING THE SAME," filed on Nov. 12, 2012, both of which are incorporated by reference in their entirety.

TECHNICAL FIELD

The disclosed implementations relate generally to the field of video encoding and decoding, and in particular, to a hybrid-resolution coding and decoding method and a video apparatus using the same.

BACKGROUND

Due to the improved capability of a processor, the reduced cost of a memory, the diversified networking support of a coded video, and the rapid development of the compression coding technology, a new generation of video coding standard H.264/AVC (Advanced Video coding) in order to sufficiently improve the coding efficient and the stability of network environment is proposed by the joint video coding team that is jointly founded by the International Telecommunications Union-Telecommunication Standardization Sector (ITU-T) video coding experts group and the International Standard Organized (ISO)/International Electrotechnical Commission (IEC) moving picture experts group. Comparing to the conventional coding standards, H.264/AC is more complex in computation, which increases the difficulty of real-time video communication. A mobile platform has less computing capacity than a personal computer, and less available storage resource. In addition, the mobile network bandwidth is relatively small and unstable. Therefore, improving the video coding speed and video compression rate is the key to promote the real-time video communication of the mobile platform.

Because of the high complexity of the video coding, an original video is generally down-sampled and a low-resolution video is encoded, which greatly decreases the data amount of a video stream that needs to be transmitted after encoding. After the low-resolution video stream is decoded at a receiving end, the low-resolution video stream is recovered to a higher resolution video stream by a super-resolution picture recovery technology. However, in the prior art when the low-resolution video is encoded using the H.264/AVC standard, because all of the video frames are encoded in low resolution, the amount of existing information after decoding that is available to the super-resolution recovery is limited. Thus, the recovered picture quality is quite poor. In addition, because all of the P frames use forward frames as reference frames, and B frames use forward/backward frames as reference frames, all of the P frames used as the reference frames need sub-pixel interpolation by an encoder, and deblock-filtering after encoding to reduce coding error propagation, which also have high computation complexities.

SUMMARY

In view of this, the present invention provides a hybrid-resolution encoding and decoding method and a video apparatus using the same that improve the efficiency of video encoding and decoding.

In order to solve the above technical problems, an implementation of the present invention provides a hybrid-resolution encoding method which includes:

at a video encoding apparatus having memory and one or more processors:

performing full-resolution standard encoding on an I frame that adopts only intra-frame coding in a video frame sequence, and performing frame reconstruction to obtain a reconstructed frame of the I frame;

performing down-sampling on the reconstructed frame of the I frame to obtain a first sampling image of the reconstructed frame of the I frame;

performing down-sampling on a non-I frame in the video frame sequence to obtain a second sampling image of the non-I frame;

performing standard encoding on the second sampling image of the non-I frame by using the first sampling image of the reconstructed frame of the I frame that corresponds to the non-I frame as a reference frame; and sending a video code stream that includes the full-resolution standard encoded I frame and the standard encoded non-I frame.

Another implementation of the present invention provides a hybrid-resolution decoding method, which includes:

at a video decoding apparatus having memory and one or more processors:

receiving a video code stream;

performing full-resolution standard decoding on an I frame that adopts only intra-frame coding in the video frame sequence;

performing down-sampling on the I frame obtained from the full-resolution standard decoding to obtain a sampling image of the I frame;

performing the standard decoding on a non-I frame in the video code stream by using the sampling image of the I frame that corresponds to the non-I frame as a reference frame; and performing super-resolution image recovery on the standard decoded non-I frame to obtain an original-resolution non-I frame image.

Another implementation of the present invention further provides a hybrid-resolution encoding apparatus. The hybrid-resolution encoding apparatus includes:

an I frame encoding module, configured to perform full-resolution standard encoding on an I frame that adopts only intra-frame coding in a video frame sequence, and perform frame reconstruction to obtain a reconstructed frame of the I frame;

a down-sampling module, configured to perform down-sampling on the reconstructed frame of the I frame to obtain a first sampling image of the reconstructed frame of the I frame, and perform the down-sampling on a non-I frame in the video frame sequence to obtain a second sampling image of the non-I frame;

a non-I frame encoding module, configured to perform the standard encoding on the second sampling image of the non-I frame by using the first sampling image of the reconstructed frame of the I frame that corresponds to the non-I frame as a reference frame; and a transmission module, configured to send a video code stream that includes the full-resolution standard encoded I frame and the standard encoded non-I frame.

Another implementation of the present invention further provides a hybrid-resolution decoding apparatus. The hybrid-resolution decoding apparatus includes:

a code stream receiving module, configured to receive a video code stream;

an I frame decoding module, configured to perform full-resolution standard decoding on an I frame that adopts only intra-frame coding in the video code stream;

a down-sampling module, configured to perform down-sampling on the full-resolution standard decoded I frame to obtain a sampling image of the I frame;

a non-I frame decoding module, configured to perform standard decoding on a non-I frame in the video code stream by using the sampling image of the I frame that corresponds to the non-I frame as a reference frame; and a super-resolution recovery module, configured to perform super-resolution image recovery on the standard decoded non-I frame to obtain an original-resolution non-I frame image.

The present invention has the following benefits: an I frame and a non-I frame in a video frame sequence are encoded by using a hybrid-resolution encoding method, so that the amount of encoded data of the non-I frame in the video frame sequence is reduced by half. Further, all non-I frames use the down-sampled I frames as reference frames, so that the sub-pixel interpolation and deblock-filtering are not required to be performed on the non-I frame at encoding. Therefore, computation complexity is reduced, and encoding and decoding speed are greatly improved without significantly affect the subjective quality.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIG. 6 is a schematic diagram of a macroblock using an interpolation filtering manner of temporal and spatial interpolation filtering according to some implementations of the present invention;

DETAILED DESCRIPTION

The technical solutions of the embodiments of the present invention are hereinafter described clearly and completely with reference to the accompanying drawings in the embodiments of the present invention. Evidently, the described embodiments are only a part rather than all of the embodiments of the present invention. All other embodiments obtained by persons of ordinary skill in the art based on the embodiments of the present invention without creative efforts shall fall within the protection scope of the present invention.

Figure 1:
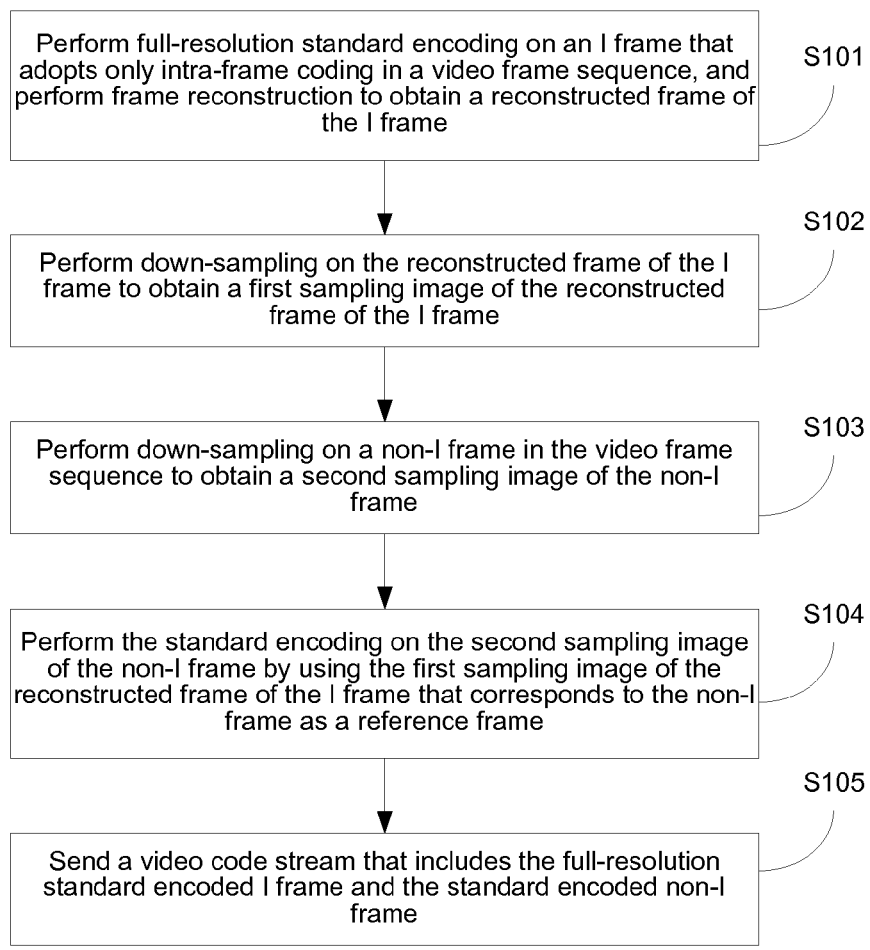
FIG. 1 is a schematic flow chart of a hybrid-resolution encoding method according to some implementations of the present invention.

FIG. 1 is a schematic flow chart of a hybrid-resolution encoding method according to some implementations of the present invention. As shown in FIG. 1, a video encoding process in some implementations of the present invention includes the following steps.

S101: Perform full-resolution standard encoding on an I frame that adopts only intra-frame coding in a video frame sequence, and perform frame reconstruction to obtain a reconstructed frame of the I frame. The video frame sequence in the implementation of the present invention is coded by being divided into multiple consecutive groups of pictures (GOP). Every GOP includes at least one I frame that adopts only intra-frame coding and at least one non-I frame. The I frame is called an intra picture or a key frame. The I frame usually is the first frame of every GOP, and the non-I frame may include a P frame and a B frame. The P frame and the B frame may use two manners: intra-frame coding and inter-frame coding. The P frame has only a forward prediction mode, that is, prediction coding merely uses the I frame prior to a current frame in the video sequence in accordance with a play order as a reference frame, and the B frame may have forward prediction mode, backward prediction mode, and bidirectional prediction mode. For example, if one video does not include a B frame, one GOP may include one I frame and three P frames. The standard encoding or standard decoding for a video that is mentioned in the implementations of the present invention may be video encoding and decoding processes using the H.264/AVC standard. In some implementations, other video encoding and decoding standards proposed by the ITU-T or ISO/IEC may also be used. Because in present, the H.264/AVC is widely used video encoding and decoding standard, the implementations of the present invention are all described by using the H.264/AVC standard as examples. It is undoubted that a person skilled in the art can find that the technical problem to be solved by the present invention can also be solved by using other encoding and decoding standards. Therefore, in some implementations, the coding for the video is described as follows: first, the full-resolution H.264 standard coding is performed on intra-frame coded I frames in pictures of the video; a 16×16 (pixel×pixel) macroblock is used as a basic coding unit and intra prediction is performed on a macroblock to be coded by using pixels in a coded macroblock; and second, an obtained predicted value is subtracted from an actual pixel value of the macroblock to be coded, so as to obtain residual data of the macroblock. The I frame coding process is to reorder and entropy code the transformed and quantized residual data, so as to obtain a data packet applicable to network transmission, i.e., a coding result of the I frame. The frame reconstruction process of the I frame is described as follows: after being inverse quantized and inverse transformed, the quantized residual data is added to the predicted value, and goes through a deblock-filter, so that the reconstructed frame of the I frame can be obtained.

S102: Perform down-sampling on the reconstructed frame of the I frame to obtain a first sampling image of the reconstructed frame of the I frame. Assume that the original width and height of a video frame picture are respectively w and h (with a unit of pixel), and the width and height of the first sampling image obtained from down-sampling the reconstructed frame of the I frame are w/a and h/b (a>1, b>1). The H.264 standard coding uses the 16×16 macroblock as the basic coding unit, so that if the width and height of the first sampling image of the reconstructed frame of the I frame obtained from the down-sampling, are not integral multiples of 16 pixels, the first sampling image needs to be expanded so as to make the width and height of the sampling picture to be integral multiples of 16 pixels, and the sampling image obtained in this way is used as the reference frame of the non-I frame.

S103: Perform down-sampling on the non-I frame in the video frame sequence to obtain a second sampling image of the non-I frame. The down-sampling for the non-I frame is similar to the down-sampling for the reconstructed frame of the I frame, the width of the obtained second sampling image is 1/a of the width of an original frame picture and the height is 1/b of that of the original frame picture, and a and b are greater than 1. If the width and height of the obtained second sampling image are not integral multiples of the width and height of the macroblock (for example, in the H.264 standard, the width and the height of the macroblock are both 16 pixels), the second sampling image is expanded to obtain a fourth sampling image of the picture with width and height being integral multiples of the width and height of the macroblock.

S104: Perform the H.264 standard encoding on the second sampling image of the non-I frame by using the first sampling image of the reconstructed frame of the I frame that corresponds to the non-I frame as a reference frame. Specifically, if the non-I frame is the P frame, the corresponding I frame thereof is the I frame prior to the P frame in the video frame sequence in accordance with the play order; if the non-I frame is the B frame, the corresponding I frame is the I frame prior to and/or the I frame after the B frame in the video frame sequence in accordance with the play order, that is, if the forward prediction mode is used, the corresponding I frame of the B frame is the same as that of the P frame which is the previous I frame in accordance with the play order in the video frame sequence; if a backward prediction mode is used, the corresponding I frame thereof is the I frame after the B frame in accordance with the play order in the video frame sequence; and if the bidirectional prediction mode is used, the corresponding I frame thereof is the I frame prior to and the I frame after the B frame in accordance with the play order in the video frame sequence. In order to perform coding on a certain non-I frame, first, the corresponding I frame of the non-I frame needs to be found, so that the first sampling image of the reconstructed frame of the I frame can be obtained and used as a reference frame, and then, according to the reference frame, the H.264 standard coding may be performed on the second sampling image of the non-I frame obtained from the down-sampling, specifically including: performing motion estimation on the second sampling image of the non-I frame obtained from the down-sampling in units of macroblocks in the reference frame, so as to find the most closely matching macroblock in the reference frame. Further, a motion vector of the macroblock is obtained and residual data is obtained by comparing an actual macroblock with a matching macroblock in the reference frame. And further, packing the residual data together with the motion vector after the residual data is integer transformed, quantized, reordered, and entropy coded, a data packet applicable to network transmission is obtained, that is, a coding result of the non-I frame, is obtained.

S105: Send a video code stream that includes the full-resolution standard encoded I frame and the standard encoded non-I frame obtained from the coding.

Figure 2:
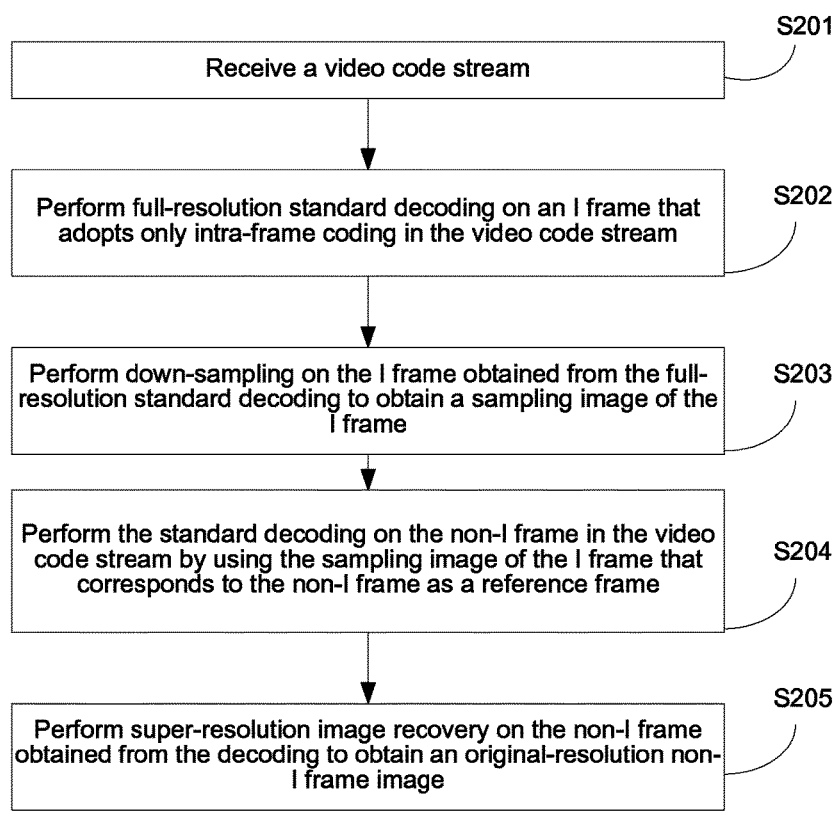
FIG. 2 is a schematic flow chart of a hybrid-resolution decoding method according to some implementations of the present invention.

FIG. 2 is a schematic flow chart of a hybrid-resolution decoding method according to some implementations of the present invention. As shown in FIG. 2, the flow chart of the hybrid-resolution decoding method according to some implementations of the present invention may include the following steps.

S201: Receive a video code stream. Specifically, in the implementation of the present invention, the video code stream of the decoding may be a hybrid-resolution encoded video code stream in the forgoing implementation, including a coded I frame and a coded non-I frame.

S202: Perform full-resolution H.264 standard decoding on an I frame merely adopting intra-frame coding in the video code stream. The obtained I frame in the video code stream is encoded by using a full-resolution H.264 standard during the encoding, so that in a decoding device, the I frame can be decoded by using the full-resolution H.264 standard, so as to obtain a full-resolution I frame picture.

S203: Perform down-sampling on the I frame obtained from the full-resolution standard decoding to obtain a sampling picture of the I frame. Specifically, the same with the coding, the down-sampling is performed on the I frame picture obtained from the decoding, and the width of the obtained sampling picture is 1/a of the width of an original frame picture and the height is 1/b of that of the original frame picture, and a and b are greater than 1. If the width and height of the obtained sampling picture are not integral multiples of the width and height of a macroblock (for example, in the H.264 standard, the width and the height of the macroblock are both 16 pixels), the sampling picture is expanded to obtain a sampling picture of the picture with width and height being integral multiples of the width and height of the macroblock.

S204: Perform the H.264 standard decoding on the non-I frame in the video code stream by using the sampling picture of the I frame corresponding to the non-I frame as a reference frame. Specifically, if the non-I frame is a P frame, the corresponding I frame thereof is the I frame prior to the P frame in accordance with a play order in a video frame sequence; if the non-I frame is a B frame, the corresponding I frame is the I frame prior to and/or the I frame after the B frame in accordance with the play order in the video frame sequence, that is, if a forward prediction mode is used, the corresponding I frame of the B frame is the same as that of the P frame which is the previous I frame in accordance with the play order in the video frame sequence; if a backward prediction mode is used, the corresponding I frame thereof is the I frame after the B frame in accordance with the play order in the video frame sequence; and if a bidirectional prediction mode is used, the corresponding I frame thereof is the I frame prior to and the I frame after the B frame in accordance with the play order in the video frame sequence. After the corresponding I frame of the non-I frame is obtained, the sampling picture of the corresponding I frame that is obtained from the down-sampling is used as the reference frame of the non-I frame. With respect to every macroblock in the non-I frame, according to a motion vector of the macroblock, the corresponding macroblock in the reference frame is found and a predicted value of the macroblock is obtained, and then, residual data of the macroblock being inverse quantized and inverse transformed is added to the predicted value, so that a reconstructed macroblock can be obtained after the processing of a deblock-filter.

S205: Perform super-resolution picture recovery on the non-I frame obtained from the decoding, so as to obtain an original-resolution non-I frame picture. Specifically, the non-I frame in the video code stream is coded after the down-sampling, and the picture obtained from the decoding is also a low-resolution picture after the down-sampling, so that the non-I frame obtained from the decoding needs super-resolution picture recovery after the decoding, so as to obtain the original-resolution non-I frame picture.

Figure 3:
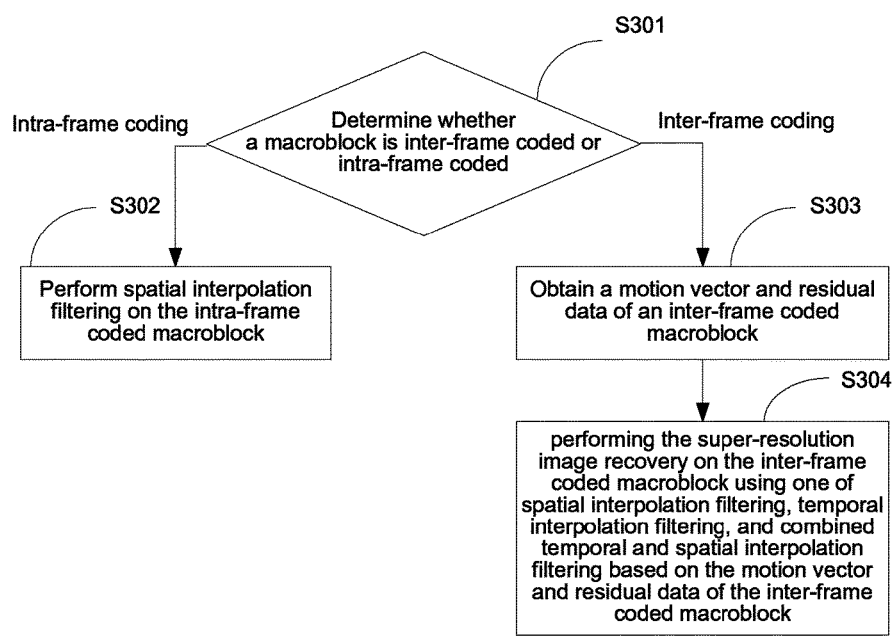
FIG. 3 is a schematic flow chart of performing super-resolution recovery on a non-I frame obtained from decoding.

In a specific implementation, the method for performing the super-resolution picture recovery on the non-I frame obtained from the decoding, as shown in FIG. 3, may include the following steps.

S301: Determine whether a current macroblock is inter-frame coded or intra-frame coded. If the macroblock is intra-frame coded, perform step S302; if the macroblock is inter-frame coded, perform step S303.

Figure 4:
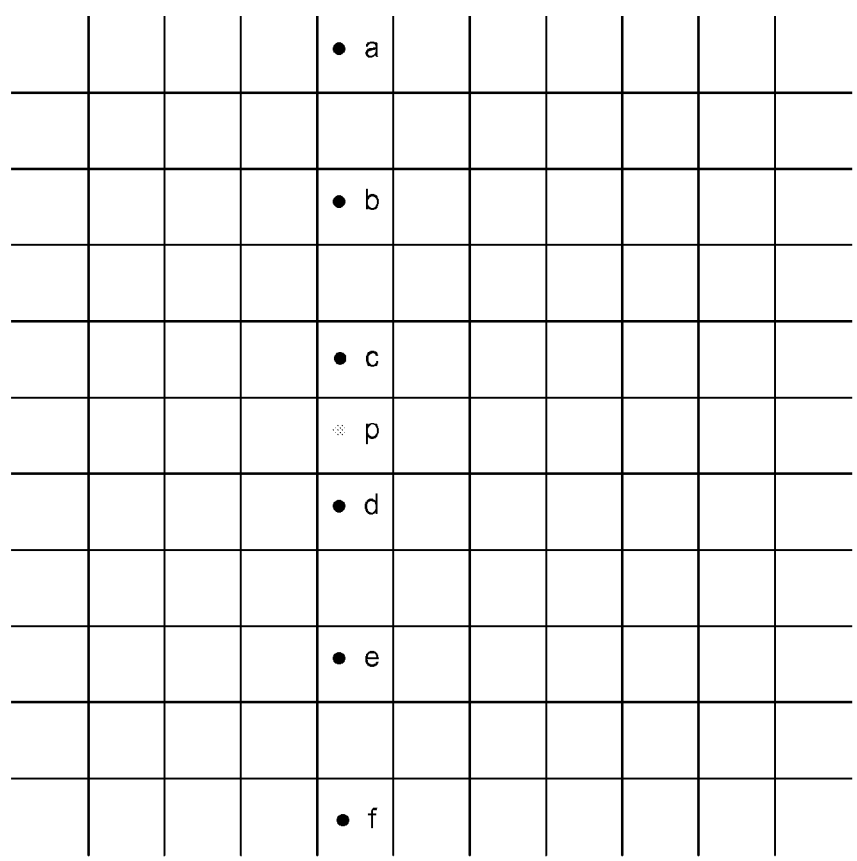
FIG. 4 is a schematic diagram of a macroblock performing spatial interpolation filtering according to some implementations of the present invention.

S302: Perform spatial interpolation filtering on the intra-frame coded macroblock in the non-I frame obtained from the decoding. For example, 6-tap interpolation coefficients (1, −5, 20, 20, −5, 1)/32 of the H.264/AVC may be used for performing intra-frame interpolation to complete the super-resolution recovery of the macroblock. As shown in FIG. 4, a pixel p is a pixel to be interpolated, and pixels a, b, c, d, e, and f are existing pixels, so that a pixel value of the pixel p is $p=(20*(c+d)-5*(b+e)+a+f+16)/32$.

S303: Obtain a motion vector and residual data of an inter-frame coded macroblock in the non-I frame obtained from the coding.

S304: Select, according to the motion vector and the residual data of the macroblock that are obtained from S303, to use spatial interpolation filtering, temporal interpolation filtering, or combined temporal and spatial interpolation filtering, so as to perform the super-resolution picture recovery on the inter-frame coded macroblock. When performing the super-resolution picture recovery on the inter-coded macroblock in the manner of temporal interpolation filtering or combined temporal and spatial interpolation filtering, the inter-coded macroblock may be performed with the super-resolution picture recovery according to the picture obtained from the H.264 standard decoding of the corresponding I frame of the non-I frame.

Figure 5:
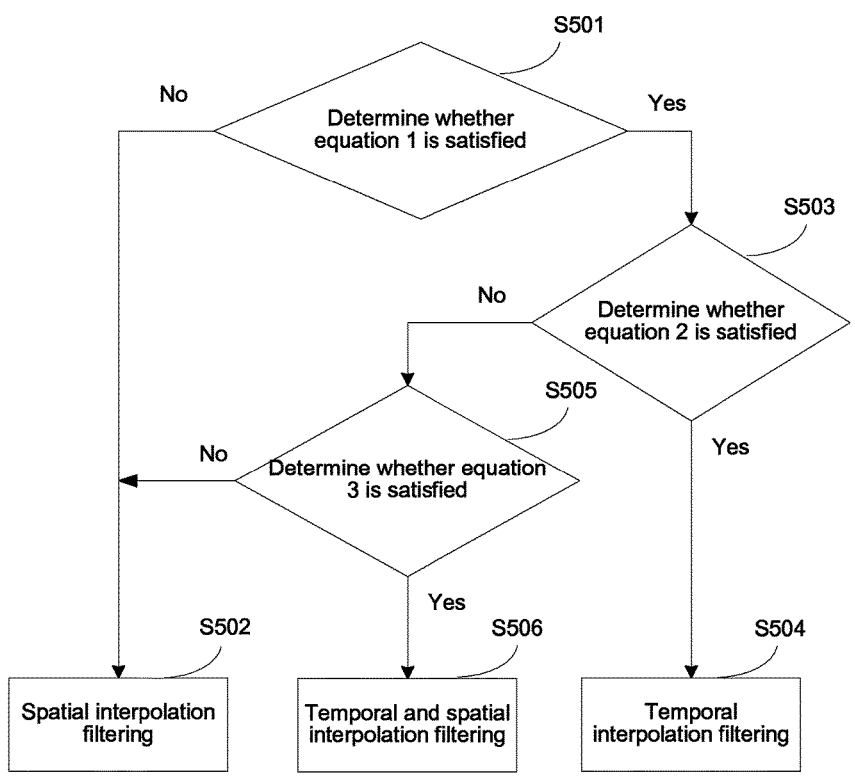
FIG. 5 is a schematic flow chart of selecting an interpolation filtering manner for an inter-coded macroblock according to some implementations of the present invention.

In a specific implementation, a method flow chart shown in FIG. 5 may be used for selecting one of the forgoing three interpolation filtering manners.

S501: Determine whether an equation 1 is satisfied according to a motion vector and residual data of a macroblock. Equation 1 is a condition to determine whether motion estimation of the macroblock is accurate. If equation 1 is not satisfied, it indicates that the motion estimation of a current macroblock is not accurate, and step S502 is performed; and if equation 1 is satisfied, step S503 is performed.

S502: Perform super-resolution picture recovery on an inter-frame coded macroblock through spatial interpolation filtering.

S503: Determine whether an equation 2 is satisfied according to the motion vector and residual data of the macroblock. When equation 2 is satisfied, it indicates that the current macroblock may be in one of the following three situations:

1) picture content of the macroblock is almost stationary and the motion estimation is relatively accurate;

2) picture content of the macroblock moves slightly and the motion estimation is accurate; and 3) picture content of the macroblock moves intensely but the motion estimation is quite accurate.

Therefore, when it is determined that equation 2 can be satisfied according to the motion vector and residual data of the macroblock, step S504 is performed; otherwise, S505 is performed.

S504: Select temporal interpolation filtering to perform the super-resolution picture recovery on the macroblock. For example, the super-resolution picture recovery may be performed on a macroblock A by using the picture obtained from the full-resolution H.264 standard decoding of the corresponding I frame, that is, a corresponding macroblock in the picture obtained from the full-resolution H.264 standard decoding of the corresponding I frame is copied directly.

S505: Determine whether an equation 3 is satisfied according to the motion vector and residual data of the macroblock. When equation 3 is satisfied, it indicates that the current macroblock may be in one of the following three situations:

1) picture content of the macroblock is almost stationary and the motion estimation is relatively accurate;

2) picture content of the macroblock moves slightly and the motion estimation is more accurate; and 3) motion estimation of the picture content of the macroblock is accurate.

When it is determined that equation 3 can be satisfied according to the motion vector and residual data of the macroblock, step S506 is performed; otherwise, S502 is performed.

Figure 6:
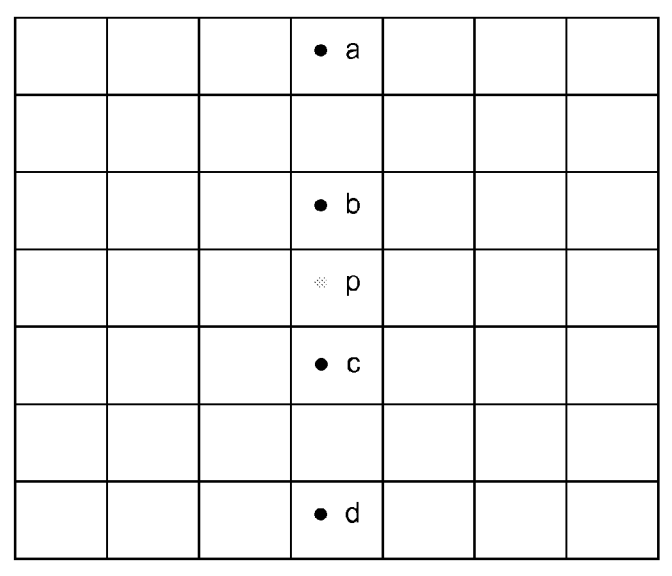

S506: Select the combined temporal and spatial interpolation filtering to perform the super-resolution picture recovery on the inter-frame coded macroblock. For example, when an optional combined temporal and spatial interpolation filtering as follows is used, in the macroblock shown in FIG. 6, a pixel p is a pixel to be interpolated, pixels a, b, c, and d are existing pixels, and a pixel i is a pixel of the corresponding macroblock in the picture obtained from the full-resolution standard decoding of the corresponding I frame, so that $p=(2*i+4*(b+c)-a-d+4)/8$. In an actual application, other forms of interpolation filtering calculation manners are also available.

In a specific implementation of the present invention, the following three parameters are obtained from calculation according to the motion vector and residual data of the macroblock:

a) sum of absolute values of residuals of the macroblock: sum;

b) sum of integer pixel motion vectors in horizontal and vertical directions of the macroblock: sum_mv; and c) a value of a residual having the maximum absolute value among residuals of the macroblock: max_res.

In the three parameters, the sum of absolute values of residuals of the macroblock sum and the value of a residual having the maximum absolute value among residuals of the macroblock max_res indicate whether the motion estimation is accurate, and the sum of integer pixel motion vectors in horizontal and vertical directions of the macroblock sum_mv indicates whether the picture moves intensely. When selecting the interpolation filtering manner, every parameter may be respectively set with a certain threshold, and for blocks of different sizes, it can be determined whether temporal interpolation can be used according to a result of comparison of the three parameters with the threshold.

For the macroblock, in conditions of different sub-block sizes, threshold settings of parameters and definitions of expressions of interpolation filtering manner selecting are listed below. In some implementations, other forms of expressions and thresholds can also be used according to an application need.

Thresholds of sums of absolute values of residuals of sub-blocks sum:

| Threshold name | Numerical value |
| --- | --- |
| TH_RES_0 | 1600 |
| TH_RES_1 | 1000 |
| TH_RES_2 | 200 |

Thresholds of sums of integer pixel motion vectors in horizontal and vertical directions of the sub-block sum_mv:

| Threshold name | Numerical value |
| --- | --- |
| TH_MV_0 | 1 |
| TH_MV_1 | 2 |
| TH_MV_2 | 4 |

Thresholds of values of residuals having the maximum absolute values among residuals of the 8×8 block of the sub-block max_res:

| Threshold name | Numerical value |
| --- | --- |
| TH_MAX_RES_0 | 20 |
| TH_MAX_RES_1 | 12 |
| TH_MAX_RES_2 | 8 |

Figure 7:
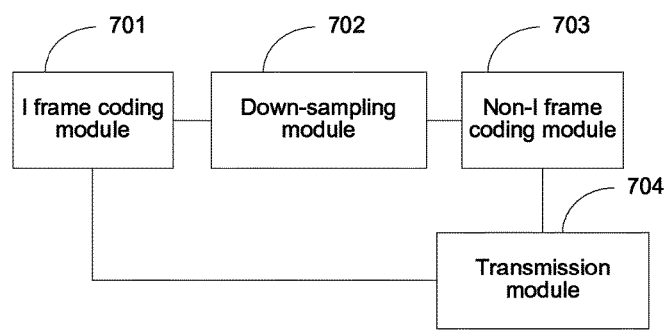
FIG. 7 is a schematic structural diagram of a hybrid-resolution coding apparatus according to some implementations of the present invention.

1) Three expressions of a macroblock in the condition that the size of a sub-block is 16×16 respectively are:

$((sum<TH\_RES\_0)\&\&(sum\_mv<TH\_MV\_2)\&\&(max\_res<TH\_MAX\_RES\_0));$    Expression 1:

$((sum\_mv<TH\_MV\_0)\&\&(sum<(TH\_RES\_0>>1))\&\&(max\_res<TH\_MAX\_RES\_0))$ $\|((sum\_mv<TH\_MV\_1)\&\&(sum<(TH\_RES\_1>>1))\&\&(max\_res<TH\_MAX\_RES\_1))$ $\|((sum\_mv<TH\_MV\_2)\&\&(sum<(TH\_RES\_2>>1))\&\&(max\_res<TH\_MAX\_RES\_2))$    Expression 2:

$((sum\_mv<TH\_MV\_0)\&\&sum<TH\_RES\_0)$ $\|((sum\_mv<TH\_MV\_1)\&\&(sum<TH\_RES\_1))\|(sum<TH\_RES\_2)$    Expression 3:

2) Three expressions of a macroblock in the condition that the size of a sub-block is 16×8 respectively are:

$((sum<TH\_RES\_0>>1)\&\&(sum\_mv<TH\_MV\_2)\&\&(max\_res<TH\_MAX\_RES\_0))$    Expression 1:

$((sum\_mv<TH\_MV\_0)\&\&(sum<(TH\_RES\_0>>2))\&\&(max\_res<TH\_MAX\_RES\_0))$ $\|((sum\_mv<TH\_MV\_1)\&\&(sum<(TH\_RES\_1>>2))\&\&(max\_res<TH\_MAX\_RES\_1)$ $\|((sum\_mv<TH\_MV\_2)\&\&(sum<(TH\_RES\_2>>2))\&\&(max\_res<TH\_MAX\_RES\_2))$    Expression 2:

$((sum\_mv<TH\_MV\_0)\&\&(sum<(TH\_RES\_0>>)))$ $\|((sum<mv<TH\_MV\_1)\&\&(sum<(TH\_RES\_1>>1)))$ $\|(sum<(TH\_RES\_2>>1))$    Expression 3:

3) Three expressions of a macroblock in the condition that the size of a sub-block is 8×16 respectively are:

$((sum<(TH\_RES\_0>>1))\&\&(sum\_mv<TH\_MV\_2)\&\&(max\_res<TH\_MAX\_RES\_0))$    Expression 1:

$((sum\_mv<TH\_MV\_0)\&\&(sum<(TH\_RES\_0>>2))\&\&(max\_res<TH\_MAX\_RES\_0))$ $\|((sum\_mv<TH\_MV\_1)\&\&(sum<(TH\_RES\_1>>2))\&\&(max\_res<TH\_MAX\_RES\_1))$ $\|sum\_mv<TH\_MV\_2)\&\&(sum<(TH\_RES\_2>>2))\&\&(max\_res<TH\_MAX\_RES\_2))$    Expression 2:

$((sum\_mv<TH\_MV\_0)\&\&(sum<(TH\_RES\_0>>1)))$ $\|((sum\_mv<TH\_MV\_1)\&\&(sum<(TH\_RES\_1>>1)))$ $\|((sum<(TH\_RES\_2>>1)))$    Expression 3:

4) Three expressions of a macroblock in the condition that the size of a sub-block is 8×8 respectively are:

$(sum<(TH\_RES\_0>>2))\&\&(sum\_mv<TH\_MV\_2)\&\&(max\_res<TH\_MAX\_RES\_0))$    Expression 1:

$((sum\_mv<TH\_MV\_0)\&\&(sum<(TH\_RES\_0>>3))\&\&(max\_res<TH\_MAX\_RES\_0))$ $\|((sum\_mv<TH\_MV\_1)\&\&(sum<(TH\_RES\_1>>3))\&\&(max\_res<TH\_MAX\_RES\_1))$ $\|((sum\_mv<TH\_MV\_2)\&\&(sum<(TH\_RES\_2>>3))\&\&(max\_res<TH\_MAX\_RES\_2))$    Expression 2:

$((sum\_mv<TH\_MV\_0)\&\&(sum<(TH\_RES\_0>>2)))$ $\|((sum\_mv<TH\_MV\_1)\&\&(sum<(TH\_RES\_1>>2)))$ $\|(sum<(TH\_RES\_2>>2))$    Expression 3:

FIG. 7 is a schematic structure diagram of a hybrid-resolution coding apparatus according to some implementation of the present invention. As shown in FIG. 7, the hybrid-resolution encoding apparatus according to some implementation of the present invention includes the following modules.

An I frame coding module 701 is configured to perform full-resolution standard encoding on an I frame merely adopting intra-frame coding in a video frame sequence, and perform frame reconstruction to obtain a reconstructed frame of the I frame. The video frame sequence in the implementation of the present invention is encoded by being divided into multiple consecutive GOPs. Every GOP includes one I frame merely adopting intra-frame coding and at least one non-I frame. The I frame is called an intra picture or a key frame. The I frame usually is the first frame of every GOP, and the non-I frame may include a P frame and a B frame. The P frame and the B frame may use two coding manners: intra-frame coding and inter-frame coding. The P frame has only a forward prediction mode, that is, prediction coding merely uses the I frame previous to a current frame in accordance with a play order in the video sequence as a reference frame, and the B frame has forward, backward, and bidirectional prediction modes. For example, if one video does not include a B frame, one GOP may include one I frame and three P frames. The standard encoding or standard decoding for a video that is mentioned in the implementations of the present invention may be video coding and decoding processes using the H.264 standard, and in an some implementations, other video coding and decoding standards proposed by the ITU-T or ISO/IEC may also be used. Because the H.264/AVC is the widely used video coding and decoding standard in the current, the present invention are all described by using the H.264 standard as examples, it is undoubted that a person skilled in the art can find that the technical problem to be solved by the present invention can also be solved by using the other coding and decoding standards. Therefore, in some implementations, the coding for the video is described as follows: first, the full-resolution H.264 standard coding is performed on intra-coded I frames in pictures of the video; a 16×16 (pixel×pixel) macroblock is used as a basic coding unit and intra prediction is performed on a macroblock to be coded by using pixels in a coded macroblock; and then, an obtained predicted value is subtracted from an actual pixel value of the macroblock to be coded, so as to obtain residual data of the macroblock. The I frame coding process is to reorder and entropy code the transformed and quantized residual data, so as to obtain a data packet applicable to network transmission, i.e., a coding result of the I frame. The frame reconstruction process of the I frame is described as follows: after being inverse quantized and inverse transformed, the quantized residual data is added to the predicted value, and goes through a deblock-filter, so that the reconstructed frame of the I frame can be obtained.

A down-sampling module 702 is configured to perform video down-sampling on the reconstructed frame of the I frame to obtain a first sampling image of the reconstructed frame of the I frame, and perform down-sampling on the non-I frame in the video frame sequence to obtain a second sampling image of the non-I frame. In some implementations, the down-sampling module 702 may further include the followings:

a down-sampling unit, configured to perform the down-sampling on a frame picture of the reconstructed frame of the I frame or on the frame picture of the non-I frame to obtain the sampling picture, where the width of the first sampling image is 1/a of the width of the frame picture, the height of the first sampling image is 1/b of that of the frame picture, and a and b are greater than 1; and an expanding unit, configured to: when the width and the height of the first sampling image are not integral multiples of the width and the height of the coded macroblock (for example, in the H.264 standard, the width and the height of the macrobolck are both 16 pixels), expand the first sampling image obtained by the down-sampling unit to obtain a third sampling image with the width and the height respectively being an integral multiple of the width and the height of the coded macroblock.

A non-I frame coding module 703 is configured to perform the H.264 standard encoding on the sampling picture of the non-I frame by using the sampling picture of the reconstructed frame of the I frame corresponding to the non-I frame as a reference frame. Specifically, if the non-I frame is a P frame, the corresponding I frame thereof is the I frame prior to the P frame in accordance with a play order in the video frame sequence; if the non-I frame is a B frame, the corresponding I frame is the I frame prior to and/or the I frame after the B frame in accordance with the play order in the video frame sequence, that is, if the forward prediction mode is used, the corresponding I frame of the B frame is the same as that of the P frame which is the previous I frame in accordance with the play order in the video frame sequence; if the backward prediction mode is used, the corresponding I frame thereof is the I frame behind the B frame in accordance with the play order in the video frame sequence; and if the bidirectional prediction mode is used, the corresponding I frame thereof is the I frame previous to and the I frame after the B frame in accordance with the play order in the video frame sequence. When the non-I frame coding module 703 performs encoding on a certain non-I frame, first, the corresponding I frame of the non-I frame needs to be found, so that the first sampling image of the reconstructed frame of the I frame can be obtained and used as the reference frame, and then, according to the reference frame, the H.264 standard coding may be performed on the second sampling image of the non-I frame obtained from the down-sampling. Some implementations may further include: performing motion estimation on the second sampling image of the non-I frame obtained from the down-sampling in units of macroblocks in the reference frame, so as to find the most closely matching macroblock in the reference frame. Therefore, a motion vector of the macroblock is obtained and residual data is obtained by comparing an actual macroblock with a matching macroblock in the reference frame. Further, the residual data is packed together with the motion vector after integer transform, quantization, reordering, and entropy coding, so that the data packet applicable to network transmission, i.e., the coding result of the non-I frame is obtained.

A transmission module 704 is configured to send a video code stream that includes the full-resolution standard encoded I frame and the standard encoded non-I frame.

Figure 8:
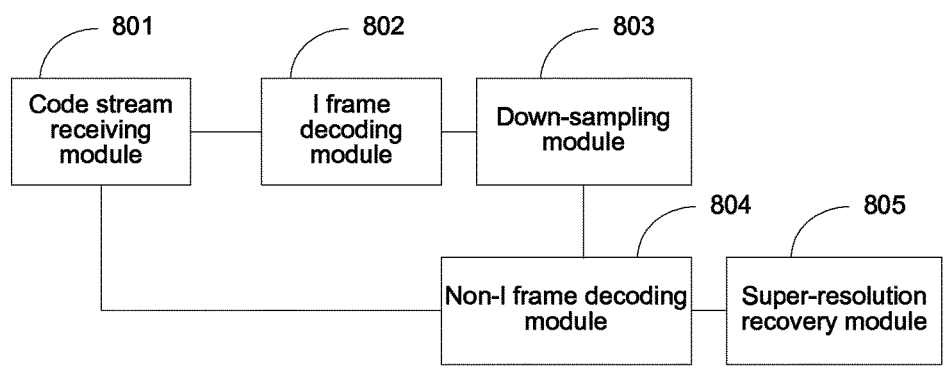
FIG. 8 is a schematic structural diagram of a hybrid-resolution decoding apparatus according to some implementations of the present invention.

FIG. 8 is a schematic structure diagram of a hybrid-resolution decoding apparatus according to some implementations of the present invention. As shown in FIG. 8, the hybrid-resolution decoding apparatus according to some implementations of the present invention may include the following modules.

A code stream receiving module 801 is configured to receive a video code stream. In some implementations, the video code stream that is obtained by the code stream receiving module 801 and needs to be decoded may be the video code stream coded by the hybrid-resolution encoding apparatus described in FIG. 7, and includes the full-resolution standard encoded I frame and the standard encoded non-I frame.

An I frame decoding module 802 is configured to perform full-resolution H.264 standard decoding on an I frame merely adopting intra-frame coding in the video code stream.

A down-sampling module 803 is configured to perform down-sampling on the I frame obtained from the full-resolution H.264 standard decoding to obtain a sampling image of the I frame. Specifically, similar to encoding, the down-sampling module 803 may further include:

a down-sampling unit, configured to perform the down-sampling on the I frame obtained from the full-resolution H.264 standard decoding to obtain the sampling image, where the width of the sampling image is 1/a of the width of a frame picture, the height of the sampling image is 1/b of that of the frame picture, and a and b are greater than 1; and an expanding unit, configured to expand the sampling image obtained by the down-sampling unit to obtain a second sampling image with the width and the height respectively being an integral multiple of the width and the height of the coded macroblock when the width and the height of the sampling image are not integral multiples of the width and the height of the coded macroblock (for example, in the H.264 standard, the width and the height of the macrobolck are both 16 pixels).

A non-I frame decoding module 804 is configured to perform the H.264 standard decoding on the non-I frame in the video code stream by using the sampling picture of the I frame corresponding to the non-I frame as a reference frame. Specifically, if the non-I frame is a P frame, the corresponding I frame thereof is the I frame prior to the P frame in accordance with a play order in the video frame sequence; if the non-I frame is a B frame, the corresponding I frame is the I frame prior to and/or the I frame after the B frame in accordance with the play order in the video frame sequence, that is, if the forward prediction mode is used, the corresponding I frame of the B frame is the same as that of the P frame which is the previous I frame in accordance with the play order in the video frame sequence; if the backward prediction mode is used, the corresponding I frame thereof is the I frame after the B frame in accordance with the play order in the video frame sequence; and if the bidirectional prediction mode is used, the corresponding I frame thereof is the I frame prior to and the I frame after the B frame in accordance with the play order in the video frame sequence. After obtaining the corresponding I frame of the non-I frame, the non-I frame decoding module 804 uses the sampling picture of the corresponding I frame that is obtained from the down-sampling as the reference frame of the non-I frame. With respect to every macroblock in the non-I frame, according to a motion vector of the macroblock, the corresponding macroblock in the reference frame is found and a predicted value of the macroblock is obtained, and then, residual data of the macroblock being inverse quantized and inverse transformed is added to the predicted value, so that a reconstructed macroblock can be obtained after the processing of a deblock-filter.

Figure 9:
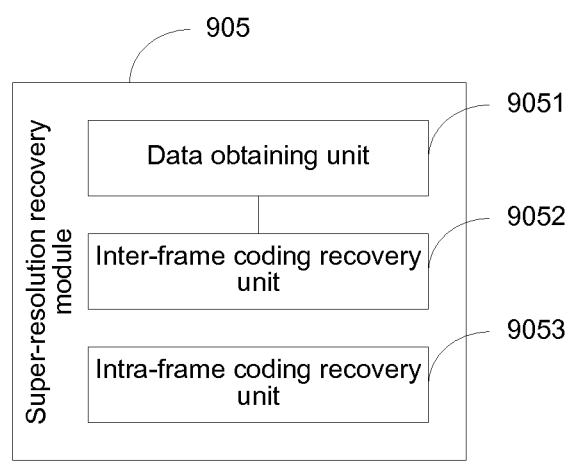
FIG. 9 is a schematic structural diagram of a super-resolution recovery module 605 in a hybrid-resolution decoding apparatus according to some implementations of the present invention.

A super-resolution recovery module 805 is configured to perform super-resolution picture recovery on the non-I frame obtained from the decoding, so as to obtain an original-resolution non-I frame picture. Specifically, as shown in FIG. 9, the super-resolution recovery module 905 in some implementations of the present invention may further include the following units. A data obtaining unit 9051, configured to obtain motion vector and residual data of an inter-frame coded macroblock in the non-I frame obtained from the coding. An inter-frame coding recovery unit 9052, configured to select, according to the motion vector and residual data of the macroblock, which are obtained by the data obtaining unit, to use spatial interpolation filtering, temporal interpolation filtering, or combined temporal and spatial interpolation filtering, so as to perform the super-resolution picture recovery on the inter-coded macroblock. When performing the super-resolution picture recovery on the inter-coded macroblock in the manner of temporal interpolation filtering or combined temporal and spatial interpolation filtering, the inter-frame coded macroblock may be performed with the super-resolution picture recovery according to the picture obtained from the H.264 standard decoding of the corresponding I frame of the non-I frame. For a specific selection method, reference may be made to the description in combination with FIG. 5 in the forgoing method, which is not repeated herein. An intra-frame coding recovery unit 9053, configured to perform the spatial interpolation filtering on the intra-coded macroblock in the non-I frame obtained from the decoding.

For the specific methods for spatial interpolation filtering, temporal interpolation filtering, and combined temporal and spatial interpolation filtering, reference may be made to the detailed description in the forgoing implementations, which is not repeated herein.

In some embodiments, an I frame and a non-I frame in a video frame sequence are coded by using a hybrid-resolution encoding manner, so that the amount of encoded data of the non-I frame in the video frame sequence is reduced by half, and all non-I frames use the down-sampled I frame as reference frames, so that the sub-pixel interpolation and deblock filtering are not required on the non-I frame at encoding, which reduces the computation complexity. Further, a large number of experiments show that the speed of an encoder can be improved by 67.40% in average and the decoding speed is improved by 15.49% in average. A decoder adaptively selects a super-resolution picture recovery manner for the non-I frame according to the residual data and motion vector of every macroblock, so that the non-I frame recovered by the super-resolution picture recovery does not have significant deterioration in picture quality comparing to a P frame coded and decoded by using a higher resolution. Further, with the same decoding video quality, resource consumed by video encoding and decoding is greatly saved, and the encoding and decoding efficiency is improved.

Figure 10:
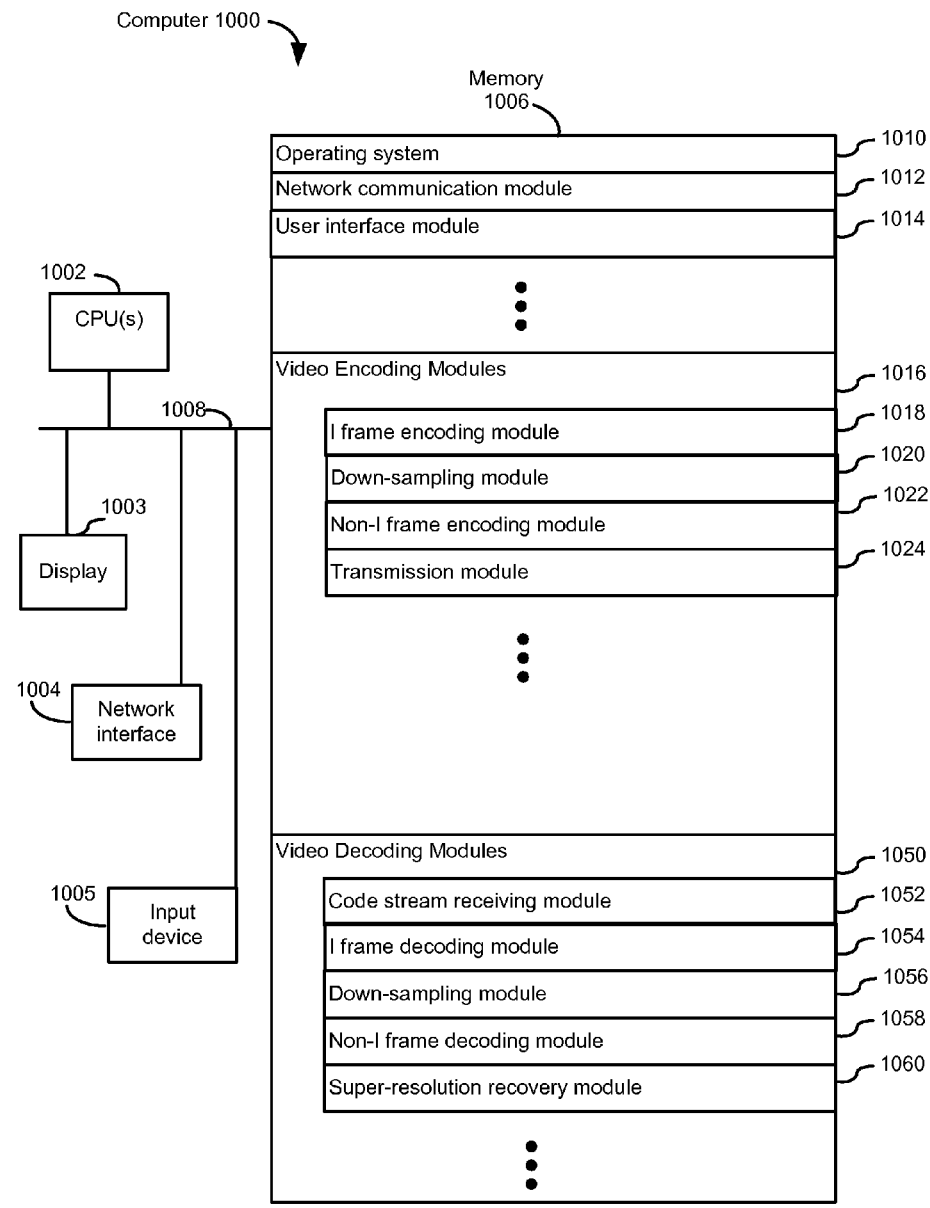
FIG. 10 is a block diagram illustrating an exemplary computer implementing the hybrid-resolution encoding and decoding method in accordance with some implementations of the present application.

FIG. 10 is a block diagram illustrating an exemplary computer 1000 implementing hybrid-resolution encoding and decoding method in accordance with some implementations of the present application. The computer 1000 may be a desktop, a laptop, a smartphone, a tablet, etc. The computer 1000 includes one or more processing units CPU(s) 1002 (also herein referred to as processors), one or more network interfaces 1004, one or more input devices 1005, a display 1003, memory 1006, and one or more communication buses 1008 for interconnecting these components. In some implementations, the one or more user input devices 1005 include a keyboard, a mouse, a trackpad, and a touchscreen. The communication buses 1008 optionally include circuitry (sometimes called a chipset) that interconnects and controls communications between system components.

The memory 1006 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 or alternatively the non-volatile memory device(s) within the memory 1006, comprises a non-transitory computer readable storage medium. In some implementations, the memory 1006 or alternatively the non-transitory computer readable storage medium stores the following programs, modules and data structures, or a subset thereof:

- an operating system 1010, which includes procedures for handling various basic system services and for performing hardware dependent tasks;
- a network communication module (or instructions) 1012 for connecting the computer 1000 with other devices (e.g., a remote server or client device) via one or more network interfaces 1004 (wired or wireless) and a communication network (e.g., the Internet);
- a user interface module 1014 for displaying different user interface controls (e.g., textboxes or dropdown lists or push buttons) as well as data and images in accordance with user input;
- a video encoding module 1016 that further includes: an I frame encoding module 1018, a down-sampling module 1020, a non-I frame encoding module 1022, a transmission module 1024, etc., which are described above in connection with FIG. 7; and
- a video decoding module 1050 that further includes: a code stream receiving module 1052, an I frame decoding module 1054, a down-sampling module 1056, a non-I frame decoding module 1058, a super-resolution recovery module 1060 etc., which are described above in connection with FIG. 8.

Persons of ordinary skill in the art should understand that all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disk, a read-only memory (Read-Only Memory, ROM), or a random access memory (Random Access Memory, RAM).

The above disclosures are merely preferred embodiments of the present invention, but are not intended to limit the scope of the claims of the present invention. Any equivalent change made according to the claims of the present invention modification still falls within the scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A hybrid-resolution decoding method, comprising:
   at a video decoding apparatus having memory and one or more processors:
   receiving a video code stream;
   performing full-resolution standard decoding on an I frame that adopts only intra-frame coding in the video code stream;
   performing down-sampling on the I frame obtained from the full-resolution standard decoding to obtain a sampling image of the I frame;

performing the standard decoding on a non-I frame in the video code stream by using the sampling image of the I frame that corresponds to the non-I frame as a reference frame, wherein the standard decoding performed on the non-I frame is different from the full-resolution standard decoding performed on the I frame; and performing super-resolution image recovery on the standard decoded non-I frame to obtain an original-resolution non-I frame image, wherein performing super-resolution image recovery on the standard decoded non-I frame further comprises:

obtaining a motion vector and residual data of an inter-frame coded macroblock in the standard decoded non-I frame; and, in accordance with a determination, based on the motion vector and the residual data, that an accuracy of motion estimation of the macroblock does not satisfy first accuracy criteria, performing the super-resolution image recovery on the inter-frame coded macroblock using spatial interpolation filtering; and, in accordance with a determination, based on the motion vector and the residual data, that the accuracy of motion estimation of the macroblock satisfies the first accuracy criteria:

in accordance with a determination, based on the motion vector and the residual data, that accuracy of motion estimation satisfies second accuracy criteria associated with a movement level of the macroblock, performing the super-resolution image recovery on the inter-frame coded macroblock using temporal interpolation filtering; and, in accordance with a determination, based on the motion vector and the residual data, that the accuracy of motion estimation does not satisfy the second accuracy criteria associated with the movement level of the macroblock:

in accordance with a determination, based on the motion vector and the residual data, that the accuracy of motion estimation satisfies third accuracy criteria associated with the movement level of the macroblock, performing the super-resolution image recovery on the inter-frame coded macroblock using combined temporal and spatial interpolation filtering; and, in accordance with a determination, based on the motion vector and the residual data, that the accuracy of motion estimation does not satisfy the third accuracy criteria associated with the movement level of the macroblock, performing the super-resolution image recovery on the inter-frame coded macroblock using spatial interpolation filtering.

2. The hybrid-resolution decoding method according to claim 1, wherein performing the super-resolution image recovery on the inter-frame coded macroblock comprises:
performing the super-resolution image recovery on the inter-frame coded macroblock by using the full-resolution standard decoded I-frame that corresponds to the non-I frame.

3. The hybrid-resolution decoding method according to claim 1, wherein performing super-resolution image recovery on the standard decoded non-I frame further comprises:

performing the spatial interpolation filtering on an intra-frame coded macroblock in the standard decoded non-I frame.

4. The hybrid-resolution decoding method according to claim 1, wherein the down-sampling comprises:

performing the down-sampling on the full-resolution standard decoded I frame to obtain the sampling image, wherein the width of the sampling image is 1/a of the width of a frame picture, the height of the sampling image is 1/b of the height of the frame picture, and a and b are greater than 1; and if the width and the height of the sampling image are not integral multiples of the width and the height of a coded macroblock of the video code stream, respectively, expanding the sampling image to obtain a second sampling image with the width and the height respectively being an integral multiple of the width and the height of the coded macroblock.

5. The hybrid-resolution decoding method according to claim 1, wherein:

if the non-I frame is a P frame, the corresponding I frame is an I frame prior to the P frame in the video code stream in accordance with a play order; and if the non-I frame is a B frame, the corresponding I frame is an I frame prior to and/or after the B frame in the video code stream in accordance with the play order.

6. A hybrid-resolution decoding apparatus comprising:
one or more processors;
memory; an
a plurality of program modules stored in the memory and to be executed by the one or more processors, the plurality of program modules further including:

a code stream receiving module, configured to receive a video code stream;

an I frame decoding module, configured to perform full-resolution standard decoding on an I frame that adopts only intra-frame coding in the video code stream;

a down-sampling module, configured to perform down-sampling on the full-resolution standard decoded I frame to obtain a sampling image of the I frame;

a non-I frame decoding module, configured to perform standard decoding on a non-I frame in the video code stream by using the sampling image of the I frame that corresponds to the non-I frame as a reference frame, wherein the standard decoding performed on the non-I frame is different from the full-resolution standard decoding performed on the I frame; and a super-resolution recovery module, configured to perform super-resolution image recovery on the standard decoded non-I frame to obtain an original-resolution non-I frame image, wherein the super-resolution recovery module comprises:

a data obtaining unit, configured to obtain a motion vector and residual data of an inter-frame coded macroblock in the standard decoded non-I frame; and an inter-frame coding recovery unit, configured to:
in accordance with a determination, based on the motion vector and the residual data, that an accuracy of motion estimation of the macroblock does not satisfy first accuracy criteria, perform the super-resolution image recovery on the inter-frame coded macroblock using spatial interpolation filtering; and, in accordance with a determination, based on the motion vector and the residual data, that the accuracy of motion estimation of the macroblock satisfies the first accuracy criteria:
in accordance with a determination, based on the motion vector and the residual data, that accuracy of motion estimation satisfies second accuracy criteria associated with a movement level of the macroblock, perform the super-resolution image recovery on the inter-frame coded macroblock using temporal interpolation filtering; and,
in accordance with a determination, based on the motion vector and the residual data, that the accuracy of motion estimation does not satisfy the second accuracy criteria associated with the movement level of the macroblock:
in accordance with a determination, based on the motion vector and the residual data, that the accuracy of motion estimation satisfies third accuracy criteria associated with the movement level of the macroblock, perform the super-resolution image recovery on the inter-frame coded macroblock using combined temporal and spatial interpolation filtering; and
in accordance with a determination, based on the motion vector and the residual data, that the accuracy of motion estimation does not satisfy the third accuracy criteria associated with the movement level of the macroblock, perform the super-resolution image recovery on the inter-frame coded macroblock using spatial interpolation filtering.

7. The hybrid-resolution decoding apparatus according to claim 6, wherein performing the super-resolution image recovery on the inter-frame coded macroblock comprises:
performing the super-resolution image recovery on the inter-coded macroblock by using the full-resolution standard decoded I frame that corresponds to the non-I frame.

8. The hybrid-resolution decoding apparatus according to claim 6, wherein the super-resolution recovery module further comprises:
an intra-frame coding recovery unit, configured to perform the spatial interpolation filtering on an intra-frame coded macroblock in the standard decoded non-I frame.

9. The hybrid-resolution decoding apparatus according to claim 6, wherein the down-sampling module comprises:
a down-sampling unit, configured to perform the down-sampling on a frame picture of the full-resolution standard decoded I frame to obtain the sampling picture, wherein the width of the sampling picture is 1/a of the width of the frame picture, the height of the sampling picture is 1/b of the height of the frame picture, and a and b are greater than 1; and
an expanding unit, configured to expand the sampling image to obtain a second sampling image of the width and the height respectively being an integral multiple of the width and the height of a coded macroblock when the width and the height of the sampling image are not integral multiples of the width and the height of the coded macroblock, respectively.

10. The hybrid-resolution decoding apparatus according to claim 6, wherein:
if the non-I frame is a P frame, the corresponding I frame is an I frame prior to the P frame in the video code stream in accordance with a play order; and
if the non-I frame is a B frame, the corresponding I frame is an I frame prior to and/or after the B frame in the video code stream in accordance with the play order.

* * * * *